(12) United States Patent
Girgenti

(10) Patent No.: US 10,595,537 B2
(45) Date of Patent: Mar. 24, 2020

(54) FUNNEL FOR FILLING TACO SHELLS OR TORTILLAS

(71) Applicant: John Paul Girgenti, New Milford, CT (US)

(72) Inventor: John Paul Girgenti, New Milford, CT (US)

(*) Notice: Subject to any disclaimer, the term of this patent is extended or adjusted under 35 U.S.C. 154(b) by 463 days.

(21) Appl. No.: 15/494,626

(22) Filed: Apr. 24, 2017

(65) Prior Publication Data

US 2017/0303547 A1 Oct. 26, 2017

Related U.S. Application Data

(60) Provisional application No. 62/326,142, filed on Apr. 22, 2016.

(51) Int. Cl.
| | |
|---|---|
| *A21C 15/00* | (2006.01) |
| *A21D 13/40* | (2017.01) |
| *A21D 13/42* | (2017.01) |
| *A21D 13/33* | (2017.01) |

(52) U.S. Cl.
CPC ............ *A21C 15/007* (2013.01); *A21D 13/33* (2017.01); *A21D 13/40* (2017.01); *A21D 13/42* (2017.01)

(58) Field of Classification Search
CPC .................................................. B65D 39/007
USPC ........................... 426/279, 282, 283; D7/700
See application file for complete search history.

(56) References Cited

U.S. PATENT DOCUMENTS

| | | |
|---|---|---|
| D244,171 S | 5/1977 | Pearce |
| D247,868 S | 5/1978 | Britt |
| D249,997 S | 10/1978 | Lindquist |
| 4,226,268 A | 10/1980 | Wasser |
| D263,715 S | 4/1982 | Walter |
| 4,347,878 A | 9/1982 | Schofield |
| 4,559,984 A | 12/1985 | Wycech |
| D282,432 S | 2/1986 | Gurka |
| 4,706,719 A | 11/1987 | Eversdijk |
| D299,301 S | 1/1989 | Wirth |
| 4,804,026 A | 2/1989 | Bailey |

(Continued)

OTHER PUBLICATIONS

Chrome Wire Taco Rack for 6 Tacos from http://www.kitchenworksinc.com/Chrome-Wire-Taco-Rack-for-6-Tacos__221128.aspx (1 page).

(Continued)

*Primary Examiner* — Ibrahime A Abraham
*Assistant Examiner* — John J Norton
(74) *Attorney, Agent, or Firm* — Ware, Fressola, Maguire & Barber LLP

(57) ABSTRACT

A funneling apparatus is provided that can be used in filling a food item, such as a taco shell. The funneling apparatus includes two opposing elongated walls connected on their ends by two opposing end walls. An opening is formed inside the funneling apparatus between the elongated walls and the end walls, which includes a top portion configured to receive contents and a bottom portion configured to dispense the contents. A concave section is provided along the base of each of the first elongated wall the second elongated wall. During use of the funneling apparatus with an item such as a taco shell, the concave section exposes the interior of the side walls formed by the taco shell. The end walls of the funneling apparatus prevent the contents inserted into the opening from spilling out of the taco shell.

14 Claims, 3 Drawing Sheets

(56) References Cited

U.S. PATENT DOCUMENTS

| | | |
|---|---|---|
| 4,823,848 A | 4/1989 | Sentmore, Sr. et al. |
| 4,856,568 A | 8/1989 | Murphy et al. |
| D317,850 S | 7/1991 | Shaw et al. |
| 5,121,779 A | 6/1992 | Green |
| D332,035 S | 12/1992 | Pigott |
| D333,506 S | 2/1993 | Krajewski |
| D341,147 S | 11/1993 | Pollak |
| D341,148 S | 11/1993 | Pollak |
| D341,149 S | 11/1993 | Pollak |
| D348,275 S | 6/1994 | Zimmerman |
| 5,479,970 A | 1/1996 | Trani |
| 5,511,595 A | 4/1996 | Stidham |
| D375,878 S | 11/1996 | Morris |
| D382,448 S | 8/1997 | Maique |
| D383,949 S | 9/1997 | Lown |
| D394,989 S | 6/1998 | Block |
| D402,169 S | 12/1998 | Hestehave et al. |
| D404,855 S | 1/1999 | Dotson |
| 5,979,516 A | 11/1999 | Grant |
| D420,869 S | 2/2000 | Diehl |
| 6,035,908 A * | 3/2000 | Hoffmann ............... B65B 39/00 141/316 |
| D422,674 S | 4/2000 | Chrisco et al. |
| D431,978 S | 10/2000 | Mayhill |
| 6,276,411 B1 | 8/2001 | Veneziano |
| D468,169 S | 1/2003 | Tumbleson |
| D475,901 S | 6/2003 | Makino et al. |
| D480,931 S | 10/2003 | Martin |
| D541,116 S | 4/2007 | Upham et al. |
| D542,610 S | 5/2007 | Silverman et al. |
| 7,237,582 B1 | 7/2007 | Harvey |
| 7,270,159 B2 | 9/2007 | Burns |
| 7,284,581 B2 | 10/2007 | Steinweg |
| D555,439 S | 11/2007 | Fletcher et al. |
| D557,225 S | 12/2007 | Sisson |
| D562,091 S | 2/2008 | Ben Shlomo et al. |
| D567,038 S | 4/2008 | Carallo |
| D576,848 S | 9/2008 | Williams |
| D631,713 S | 2/2011 | Grant |
| 7,946,317 B1 | 5/2011 | Organ |
| 8,011,396 B1 | 9/2011 | Harvey |
| D661,957 S | 6/2012 | Lee et al. |
| D662,794 S | 7/2012 | Enghard |
| D669,750 S | 10/2012 | Lee et al. |
| D671,379 S | 11/2012 | Lion et al. |
| D676,292 S | 2/2013 | Cetera |
| D680,827 S | 4/2013 | Cetera |
| 8,430,138 B2 | 4/2013 | McGeary |
| 8,485,234 B2 | 7/2013 | Pfaff et al. |
| D688,924 S | 9/2013 | Enghard |
| D703,010 S | 4/2014 | Meyer |
| 8,826,949 B2 | 9/2014 | Kent |
| D718,990 S | 12/2014 | Hester |
| D719,414 S | 12/2014 | Hester |
| D725,975 S | 4/2015 | Klenk |
| D728,326 S | 5/2015 | Wirth et al. |
| D728,327 S | 5/2015 | Wirth et al. |
| D728,328 S | 5/2015 | Wirth et al. |
| D728,329 S | 5/2015 | Wirth et al. |
| D728,330 S | 5/2015 | Wirth et al. |
| D728,331 S | 5/2015 | Wirth et al. |
| 2013/0161356 A1* | 6/2013 | Kawata ................. B65D 88/66 222/203 |
| 2017/0035063 A1 | 2/2017 | Allison |

OTHER PUBLICATIONS

Taco Stand Up—Large s/4 from http://www.kitchenworksinc.com/Taco-Stand-Up---Large-s4__896000.aspx (1 page).

* cited by examiner

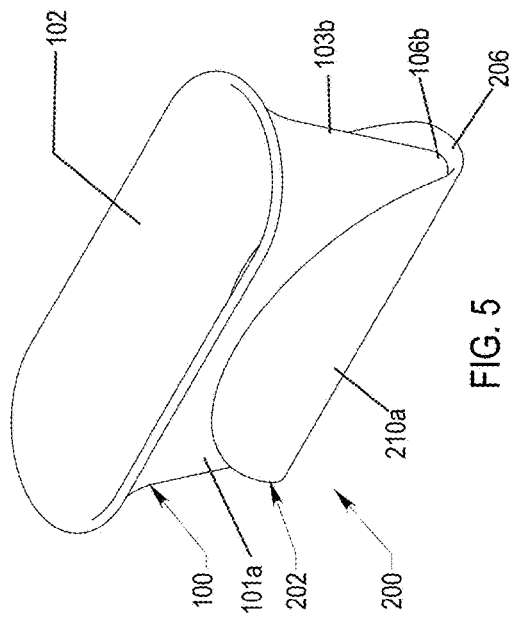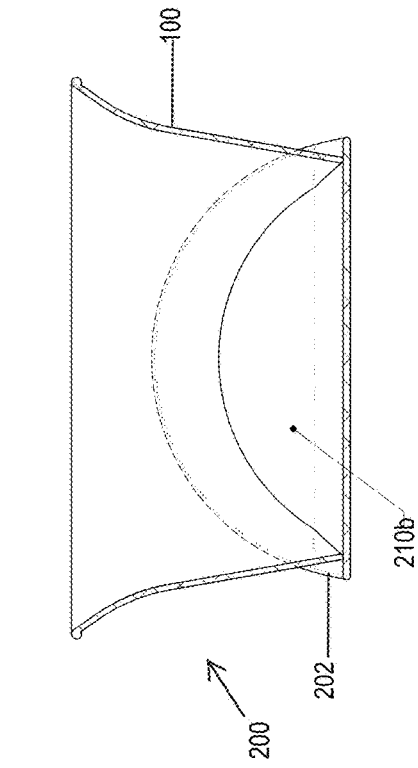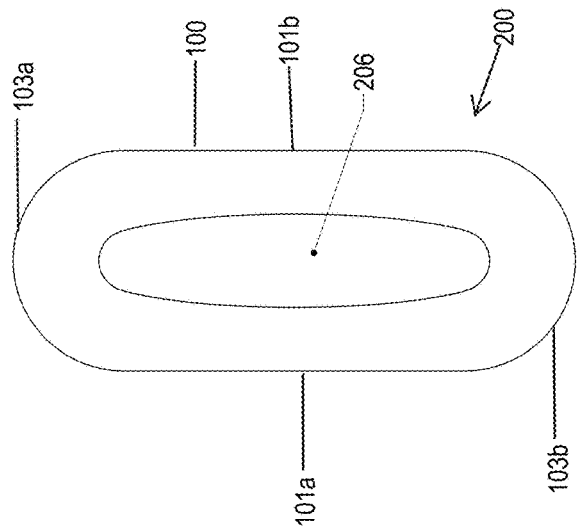

FUNNEL FOR FILLING TACO SHELLS OR TORTILLAS

CROSS-REFERENCE TO RELATED APPLICATIONS

The present application claims the benefit of U.S. Provisional Patent Application No. 62/326,142, filed Apr. 22, 2016, which is hereby incorporated by reference in its entirety.

FIELD OF THE INVENTION

The invention relates to food preparation, and more particularly to a device for filling taco shells and tortillas.

BACKGROUND OF THE INVENTION

Hard taco shells can be difficult to fill without breaking the shell or making a mess. Hard taco shells are open on both ends, making it easy for contents inserted in the shell to fall out of the shell during preparation. This is particularly likely when the shell is being overfilled.

Presently, there are products available that aid in the process of preparing and filling a taco shell. However, these products are in the form of stands that are configured to receive the shell inside the stand. As a result, such products fail to prevent the contents of a taco from spilling out of the shell during preparation, or shortly thereafter.

What is needed therefore is a product which makes the filling of a taco shell easier and which prevents the contents of the shell from spilling out.

SUMMARY OF THE INVENTION

The present invention relates to a funnel that fits into a taco shell, seating at the bottom, and aids in the process of filling a taco shell, tortilla, or other receptacle. The top of the funnel may have a large taper to provide a large opening to insert contents, guiding the contents into a tapering body section which ends at the bottom of the taco shell. At the base of the funnel is an elongated opening, which exposes the bottom of the taco shell. As inserted, the short ends of the funnel walls act as barriers to prevent contents from spilling out of the ends of the taco shell. The long sides of the funnel are shaped to expose most sides of the taco shell, so that contents inserted into the funnel settle against the shell. As the contents settle against the shell and not the funnel, the funnel can be easily removed, minimizing withdrawing content that would otherwise be caught in the funnel.

According to one embodiment of the invention, a device is provided for aiding in the filling of taco shells. The device includes a tapered shape forming a funnel, and an elongated shape with two long sides and two short sides. The long sides have large radial cuts. The short sides are closed from top to bottom of the taper.

In accordance with a first aspect of the invention, a funneling apparatus is provided comprising a first elongated wall, a second elongated wall opposing the first elongated wall, a first end wall connecting a first end of the first elongated wall to a first end of the second elongated wall, and a second end wall opposing the first end wall and connecting a second end of the first elongated wall to a second end of the second elongated wall. The funneling apparatus further comprises an opening formed between the first elongated wall, the second elongated wall, the first end wall and the second end wall and comprising a top portion configured to receive contents and a bottom portion configured to dispense contents. The base of the first elongated wall and the base of the second elongated wall each comprise a concave section.

In accordance with an embodiment of the first aspect of the invention, the funneling apparatus is configured for inserting filling in a food item. In one embodiment, the food item may be a taco shell. The first end wall and the second end wall of the funneling apparatus are configured to prevent the filling from falling out of the taco shell. The bottom portion of the opening through the funneling apparatus is configured to expose a bottom portion on the interior of the taco shell, and the concave formations are configured to expose at least a portion of the interior of opposing side walls of the taco shell.

In accordance with a further embodiment of the first aspect of the invention, a height of the first end wall and the second end wall can be greater than a height of a central portion of each of the first elongated wall and the second elongated wall.

In accordance with a further embodiment of the first aspect of the invention, a length of the top portion of the opening is greater than a length of the bottom portion of the opening.

In accordance with a further embodiment of the first aspect of the invention, a width of the top portion of the opening is greater than a width of the bottom portion of the opening.

In accordance with a further embodiment of the first aspect of the invention, the first end wall and the second end wall each comprise rounded base sections.

In accordance with a further embodiment of the first aspect of the invention, the funneling apparatus further comprises a top section and a body section. The top section is defined by the first elongated wall, the second elongated wall, the first end wall and the second end wall tapering inward at a first slope differing from one or more second slopes of the first elongated wall, the second elongated wall, the first end wall and the second end wall in the body section.

In accordance with a further embodiment of the first aspect of the invention, the first elongated wall and the second elongated wall are greater in length than the first end wall and the second end wall.

In accordance with a further embodiment of the first aspect of the invention, the first end wall and the second end wall are convex.

In accordance with a further embodiment of the first aspect of the invention, the first end wall and the second end wall are flat.

In accordance with various further embodiments of the first aspect of the invention, the funneling apparatus can be made from a plastic material, a metallic material, or a material comprising silicone.

In accordance with a second aspect of the invention, a system for filling a taco shell is provided. The system comprises a taco shell having an interior with a bottom portion positioned between two side walls and a funneling apparatus positioned within the taco shell. The funneling apparatus comprises a first elongated wall, a second elongated wall opposing the first elongated wall, a first end wall connecting a first end of the first elongated wall to a first end of the second elongated wall, and a second end wall opposing the first end wall and connecting a second end of the first elongated wall to a second end of the second elongated wall. The funneling apparatus further comprises an opening formed between the first elongated wall, the second elongated wall, the first end wall and the second end wall. The opening comprises a top portion configured to receive contents and a bottom portion exposing the bottom portion of the taco shell and configured to dispense contents. The base of the first elongated wall and the base of the second elongated wall comprise a concave section configured to expose at least a portion of the interior of the sidewalls of the taco shell.

In accordance with an embodiment of the system according to the second aspect of the invention, the first end wall and the second end wall are configured to prevent the filling from falling out of the taco shell.

In accordance with a further embodiment of the system according to the second aspect of the invention, the first end wall and the second end wall each comprise rounded base sections configured to rest against the base of the taco shell.

BRIEF DESCRIPTION OF THE DRAWINGS

FIG. 5 is an isometric view showing a system according to the present invention, including an embodiment of the funnel of the present invention in a taco shell.

FIG. 6 is a top view showing a system according to the present invention, including an embodiment of the funnel of the present invention in a taco shell.

FIG. 7 is an end view showing a system according to the present invention, including an embodiment of the funnel of the present invention in a taco shell.

FIG. 8 is a section view showing a system according to the present invention, including an embodiment of the funnel of the present invention in a taco shell.

DETAILED DESCRIPTION OF THE DRAWINGS

The present invention will now be described with reference made to FIGS. 1-12.

In accordance with the present invention, a funneling apparatus 100 is provided, as shown for example in FIGS. 1-4 and 9-12, which can be used for filling, for example, a hard taco shell, soft taco shell, or any other similar type of food product having open section to receive filling. The funneling apparatus 100 may also comprise part of a system 200, shown for example in FIGS. 5-8, which further comprises a taco shell 202.

Figure 2:
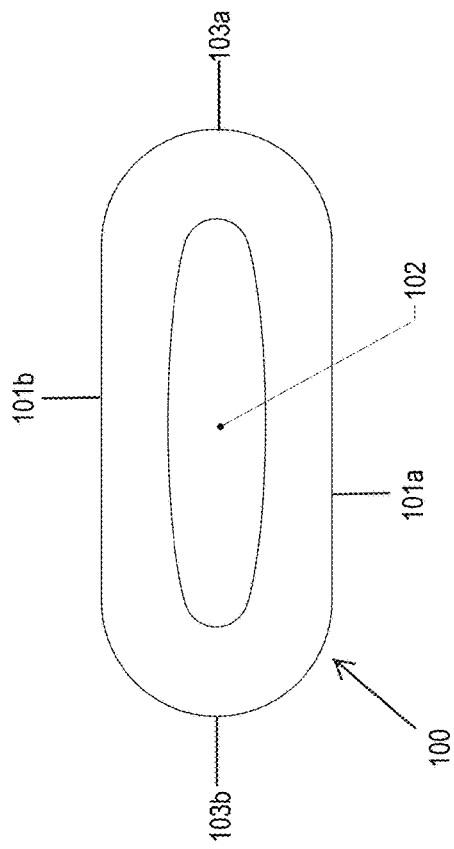
FIG. 2 is a top view showing an embodiment of the funnel according to the present invention.

As shown for example in FIG. 2, the funnel 100 may be formed by four walls, including two, opposing elongated walls 101a, 101b and two end walls 103a, 103b. The two end walls 103a, 103b connect respective ends of the opposing elongated walls 101a, 101b. The walls 101a, 101b, 103a, 103b surround an opening 102 through the funnel 100. The top portion 102a and the bottom portion 102b of the opening 102 are open, so that contents, such as food products, can be inserted into the opening 102 via the top portion 102a and pass through the opening 102, and exit the funnel 100 through the bottom portion 102b. In a preferred embodiment, the top portion 102a of the opening 102 has a greater length and width than the bottom portion 102b of the opening 102. As a result, the walls 101a, 101b, 103a, 103b each may slope inwardly, toward the center of the funnel 100, such that the larger top portion 102a of the opening 102 tapers inwardly towards the smaller bottom portion 102b. In the preferred embodiment illustrated in the Figures, the elongated walls 101a, 101b have a greater length than the end walls 103a, 103b, such that the funnel 100 may take a shape that conveniently fits within a taco shell 202, a tortilla, or any other bun, flat bread or other food item that can be similarly folded or that has an open portion to receive a filling. The end walls 103a, 103b may be rounded or convex, as shown for example in FIG. 2, which provides for a wider opening to receive contents inserted into the funnel. However, in alternative embodiments, the end walls 103a, 103b may take other shapes, such as a flat, non-rounded shape, as shown for example in FIGS. 9-12, without deviating from the scope of the present invention.

When the funnel 100 is inserted into a taco shell 202, the interior of the base 206 of the taco shell is exposed through the bottom portion 102b of the opening 102. During use of the funnel 100, the end walls 103a, 103b function to close off the open ends of the taco shell 202. As a result, when the taco shell 202 is being filled with contents that are inserted into the funnel 100, the filling cannot escape out of the ends of the taco shell 202, because the end walls 103a, 103b block such passage.

Figure 3:
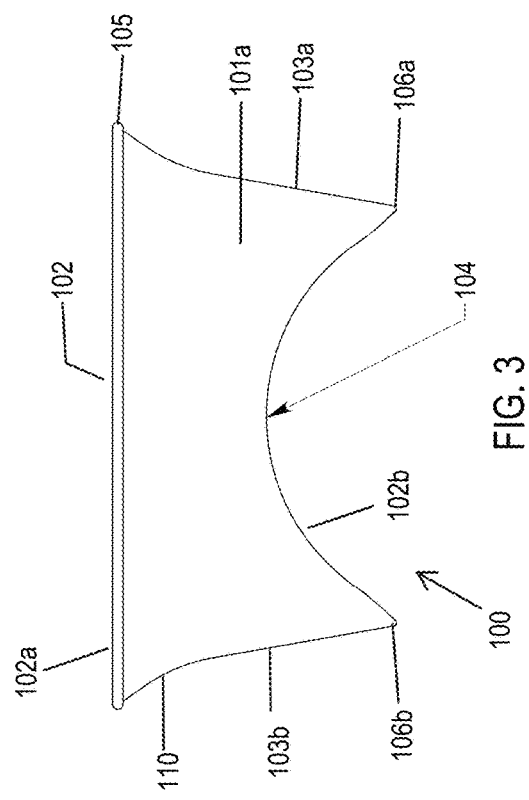
FIG. 3 is a front view showing an embodiment of the funnel according to the present invention.
Figure 9:
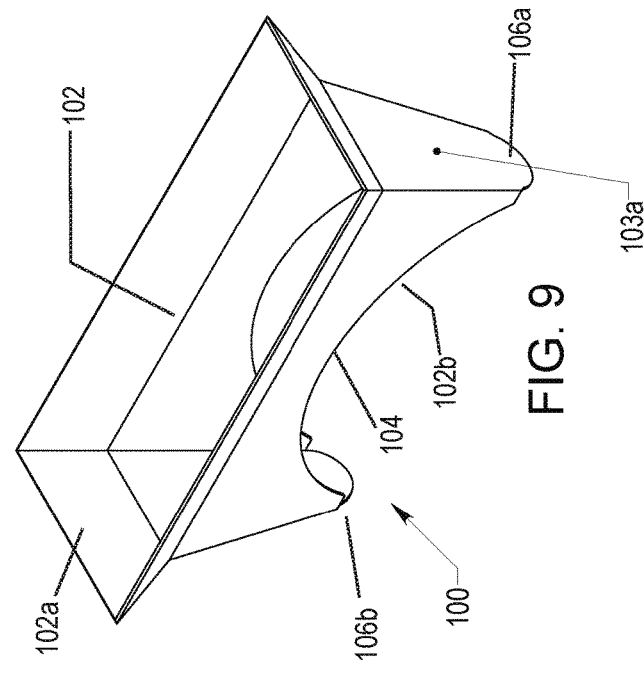
FIG. 9 is an isometric view showing a further embodiment of the funnel according to the present invention.
Figure 10:
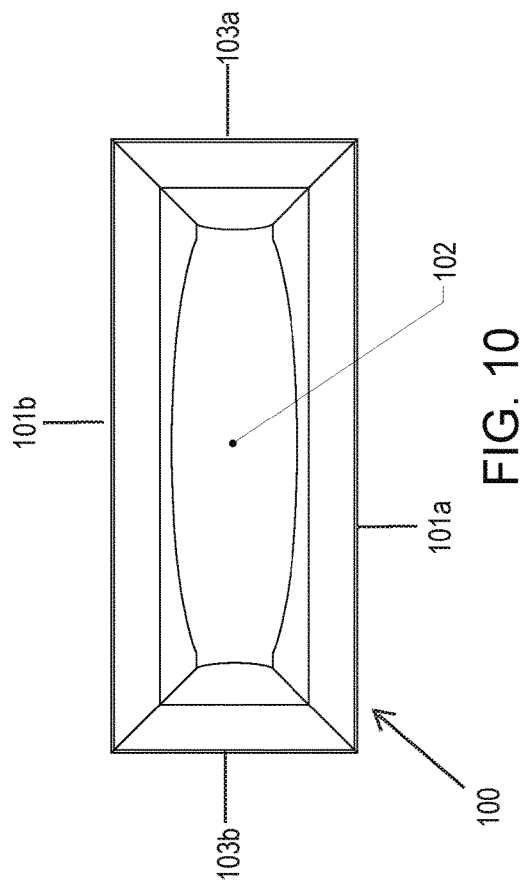
FIG. 10 is a top view showing a further embodiment of the funnel according to the present invention.
Figure 12:
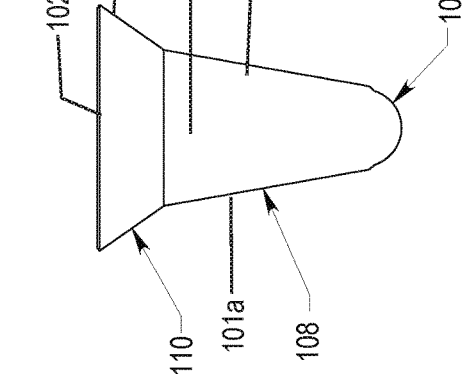
FIG. 12 is an end view showing a further embodiment of the funnel according to the present invention.
Figure 11:
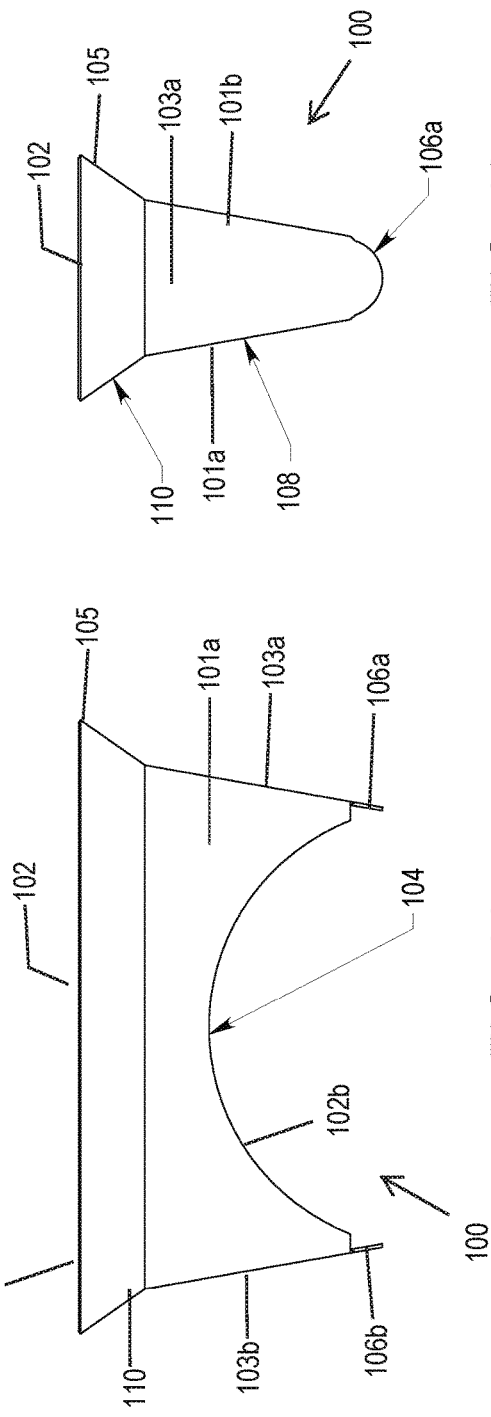
FIG. 11 is a front view showing a further embodiment of the funnel according to the present invention.

The elongated walls 101a, 101b of the funnel 100 may also comprise concave sections 104 or radial cuts, as illustrated in FIG. 3. The concave sections 104 are positioned along the base portions of the elongated walls 101a, 101b, such that the height of each of the elongated walls 101a, 101b is greater at their respective ends adjacent the end walls 103a, 103b, than in the center of the elongated walls 101a, 101b. The concave sections 104 may be rounded, as illustrated in the embodiment shown in the Figures, but may take alternative shapes in other embodiments.

When the funnel 100 is inserted into a taco shell 202, the concave sections 104 expose the interior of side walls 210a, 210b of the taco shell 202. This allows the contents inserted into the funnel 100 to rest against the sides walls 210a, 210b of the taco shell 202. As a result, the contents inserted into the funnel 100 settle against the interior walls 210a, 210b of the taco shell 202 and not the funnel 100, so that the funnel 100 can be easily removed without withdrawing content that would otherwise be caught in the funnel 100.

Figure 1:
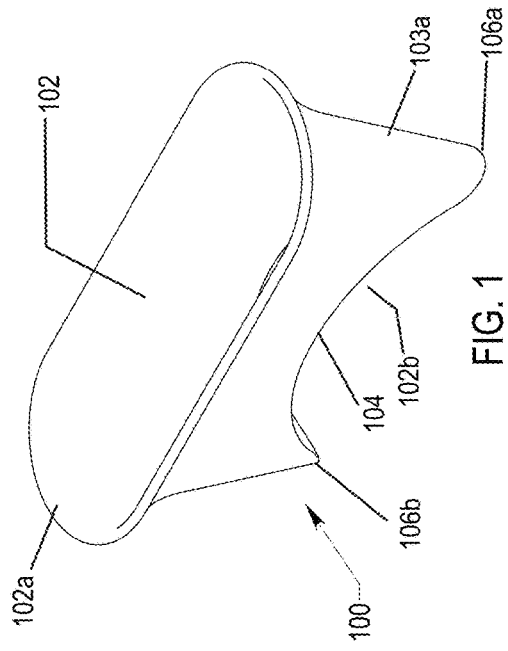
FIG. 1 is an isometric view showing an embodiment of the funnel according to the present invention.
Figure 4:
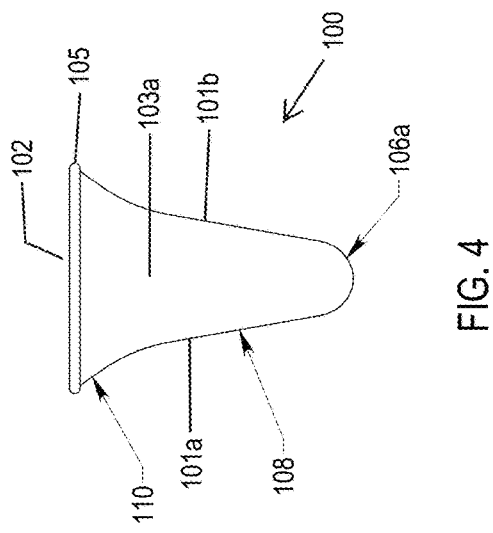
FIG. 4 is an end view showing an embodiment of the funnel according to the present invention.

As illustrated in FIG. 4, for example, the funnel 100 may also comprise one or more bottom portions 106a, 106b. The bottom portions 106a, 106b may be rounded at the base of the end walls 103a, 103b to conform to the nominal, rounded shape of the bottom 206 of a taco shell 202. The rounded bottom portions 106a, 106b are further configured to aid in trapping the inserted contents into the funnel 100, keeping them from spilling out the ends of the taco shell 202 or tortilla.

The top section 110 of the funnel 100 may in a preferred embodiment provide a large taper around the top portion 102a of the opening 102 of the funnel 100. This large taper around the top section 110 of the funnel 100 provides a larger area of access for depositing contents into the funnel 100. A lip 105 may further be arranged around the top portion 102a of the opening 102.

The elongated walls 101a, 101b and end walls 103a, 103b may be sloped inward along their entire height, not only in the top section 110, such that neither the opposing, elongated walls 101a, 101b or opposing end walls 103a, 103b are parallel at any point along their height, as shown in the embodiments illustrated in the Figures. This tapering width of the funnel 100 is nominal to the taper of a hard taco shell 202. The degree of slope of the elongated walls 101a, 101b and end walls 103a, 103b may vary along their respective heights, as illustrated in the Figures, wherein the top section 110 is defined by having a different slope than the body section 108 positioned beneath it, or may be of a consistent slope. In alternative embodiments, at least a portion of the opposing, elongated walls 101a, 101b and/or opposing end walls 103a, 103b, may be vertical with no slope, such that at least those vertical portions the opposing, elongated walls 101a, 101b and/or opposing end walls 103a, 103b are parallel to each other.

The funnel 100 according to the present invention can be made from any suitable material, including but not limited to plastic, stainless steel or other metal, silicone, or other synthetic materials.

As illustrated in FIGS. 5-8, the funnel 100 may be used in combination with a taco shell 202, or tortilla, or other food item, in a system 200 or method for filing a taco shell 202 (or tortilla or other food item). The funnel 100 is dimensioned so it can be inserted into and rest within the taco shell 202. In certain embodiments of the system 200, a taco shell stand 220 may be provided for holding the taco shell 202 upright during the filling process. The desired contents to fill the taco shell 202 can be inserted through the opening of the funnel 100 and settle against the bottom 206 and walls 210a, 210b on the interior of the taco shell, as previously described. The end walls 103a, 103b prevent the contents inserted into taco shell 202 from spilling out the open ends of the taco shell 202. When the desired amount of filling for the taco shell 202 is inserted into the funnel 100, the funnel 100 can be removed, leaving the filled contents inside the taco shell 202.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

What is claimed:

1. A system for filling a taco shell, comprising:
    a taco shell having an interior with a bottom portion positioned between two side walls; and
    a funneling apparatus positioned within the taco shell, comprising:
        a first elongated wall;
        a second elongated wall opposing the first elongated wall;
        a first end wall connecting a first end of the first elongated wall to a first end of the second elongated wall;
        a second end wall opposing the first end wall and connecting a second end of the first elongated wall to a second end of the second elongated wall; and
        an opening formed between the first elongated wall, the second elongated wall, the first end wall and the second end wall and comprising a top portion configured to receive contents and a bottom portion exposing the bottom portion of the taco shell and configured to dispense contents; and
        wherein the base of the first elongated wall and the base of the second elongated wall comprise a concave section configured to expose at least a portion of the interior of the sidewalls of the taco shell.

2. The system according to claim 1, wherein the first end wall and the second end wall are configured to prevent the filling from falling out of the taco shell.

3. The system according to claim 1, wherein the first end wall and the second end wall each comprise rounded base sections configured to rest against the base of the taco shell.

4. The system according to claim 1, wherein a height of the first end wall and the second end wall is greater than a height of a central portion of each of the first elongated wall and the second elongated wall.

5. The system according to claim 1, wherein a length of the top portion of the opening is greater than a length of the bottom portion of the opening.

6. The system according to claim 1, wherein a width of the top portion of the opening is greater than a width of the bottom portion of the opening.

7. The system according to claim 1, comprising a top section and a body section, wherein the top section is defined by the first elongated wall, the second elongated wall, the first end wall and the second end wall tapering inward at a first slope differing from one or more second slopes of the first elongated wall, the second elongated wall, the first end wall and the second end wall in the body section.

8. The system according to claim 1, wherein the first elongated wall and the second elongated wall are greater in length than the first end wall and the second end wall.

9. The system according to claim 1, wherein the first end wall and the second end wall are convex.

10. The system according to claim 1, wherein the first end wall and the second end wall are flat.

11. The system according to claim 1, wherein the funneling apparatus is made from a plastic material.

12. The system according to claim 1, wherein the funneling apparatus is made from a metallic material.

13. The system according to claim 1, wherein the funneling apparatus is made from a material comprising silicone.

14. The system according to claim 1, wherein the taco shell comprises one or more of a hard taco shell, a soft taco shell, a tortilla or a rigid or foldable food product having an elongated open section to receive filling in the interior between two side walls.

* * * * *